A. ELDRED.
Potato-Digger.
No 4,656.
Patented July 24, 1846.
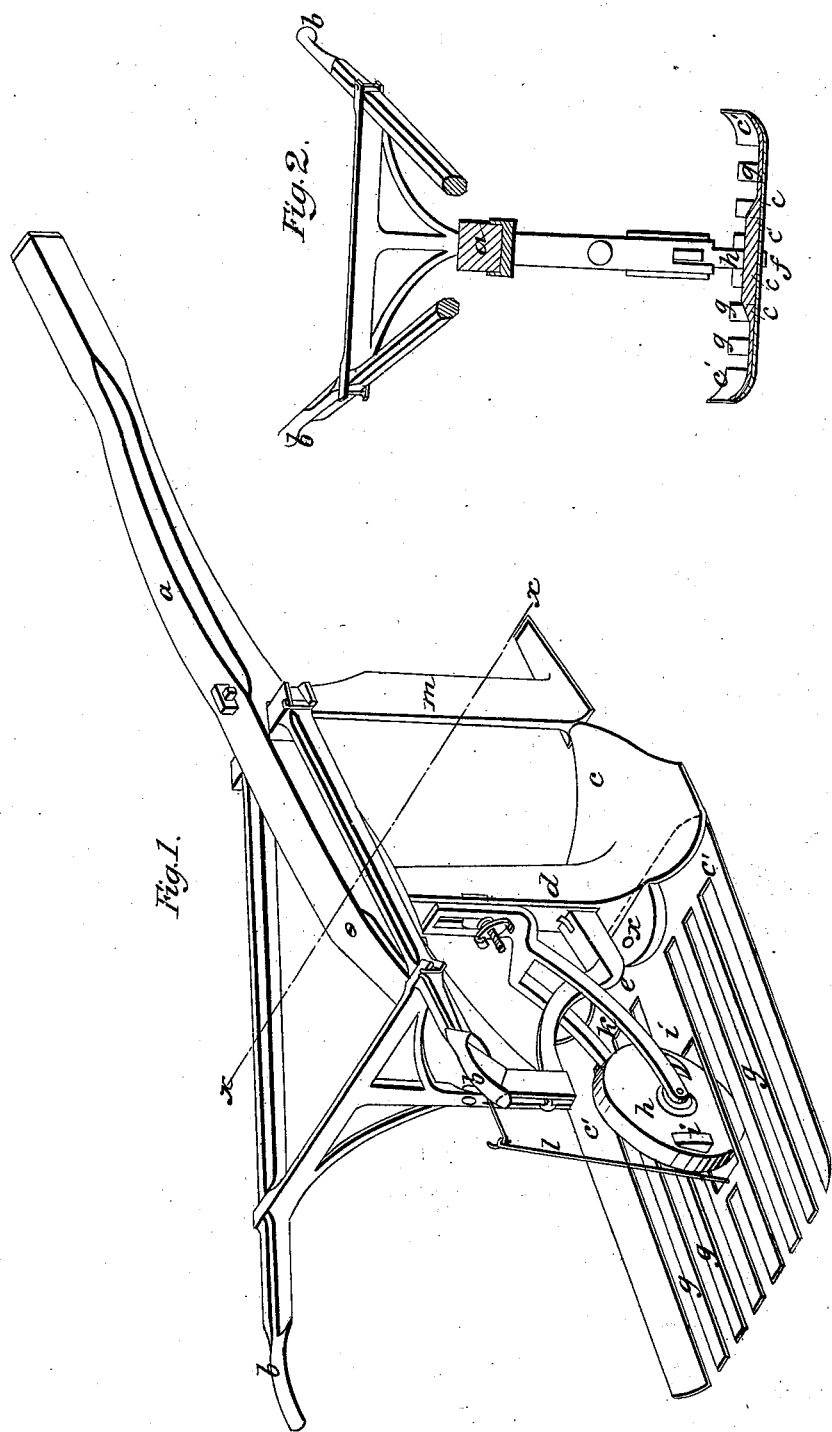

UNITED STATES PATENT OFFICE.

ALLEN ELDRED, OF OPPENHEIM, NEW YORK.

IMPROVEMENT IN POTATO-PLOWS.

Specification forming part of Letters Patent No. 4,656, dated July 24, 1846.

*To all whom it may concern:*

Be it known that I, ALLEN ELDRED, of Oppenheim, in the county of Fulton and State of New York, have invented a new and useful Machine for Digging Potatoes and Separating them from the Dirt; and I do hereby declare that the following is a full, clear, and exact description of the principle or character thereof which distinguishes it from all other things before known, and of the manner of making, constructing, and using the same, reference being had to the accompanying drawings, making part of this specification, in which—

Figure 1 is a perspective view, and Fig. 2 a cross vertical section taken at the line X X of Fig. 1.

The same letters indicate like parts in all the figures.

It has been attempted to dig potatoes and separate them from the dirt by means of a scoop and an inclined endless chain of rakes; but so far as I have been able to ascertain this has failed, as might have been anticipated from the failure of all previous attempts to excavate and remove earth by means of endless chains passing over rollers, in consequence of the accumulation of earth between the rollers and chain or belt. I have devised a means, however, for this purpose which is entirely different, and which avoids the objection pointed out above. It consists in the employment of a scoop with the sides curved up and the forward part with a point in the middle, and an oblique cutting-edge on each side, extending from the front to the top of the curved sides, the scoop being provided with a standard rising from the middle of it to form the connection with the beam; and to this scoop is jointed a plate with long projecting inclined fingers or rods, onto which the potatoes and earth dug up by the scoop are discharged, so that the earth may drop through the spaces between the teeth or fingers, while the potatoes are forced up the inclined plane formed by the fingers, and are discharged above the surface of the earth, to be readily gathered. The plate from which these fingers project is connected with the scoop by means of a single bolt, $x$, on which it vibrates by means of tappets or cones on the faces of a wheel to shake the earth and facilitate the separation of the potatoes therefrom.

In the accompanying drawings, $a$ represents the beam, made in manner similar to a plow-beam; and $bb$, the handles, which are secured to the beam in any desired manner. The scoop $c$ is made with a point, and the cutting-edge extending obliquely on either side from the point to the sides $c'c'$, which are curved up to form the scoop and to prevent the potatoes from passing over the sides; and the standard $d$, which I usually cast with it, rises from the middle of the scoop and near the back of it, and extends to and is properly secured to the beam in any desired manner. To the bottom of this scoop is adapted a metal plate, $e$, curved to correspond with the curved sides of the scoop, and connected with it by means of a bolt, $f$, on which it vibrates, and from the back of this plate project a series of long fingers or rods, $g$, which are sufficiently inclined to have their back ends above the ground, while the scoop is at a sufficient depth to dig up the potatoes. The spaces between the fingers are made sufficiently wide to prevent the passage of the potatoes, and yet permit the earth to pass through. That part of the plate $e$ which is back of the standard extends back sufficiently far and of sufficient width to admit of making a mortise, in which a wheel, $h$, runs freely, the faces of which are provided with tappets or cams $i$, one on each face, and placed on opposite sides of the axis, so as to have them act alternately, and thus vibrate the plate from one side to the other to shake the earth and discharge it through the spaces between the fingers. The axle of this wheel runs in the two arms of a brace, $k$, connected with the standard by means of a bolt passing through a slot, to admit of adjusting the wheel to the depth required. The plate of fingers is suspended to the frame back of the wheel by means of a rod, $l$. A colter, $m$, (similar to those used in plows,) is placed in front, with the point of the scoop let into a hole in the back of it.

From the foregoing it will be obvious that as the machine passes through the earth the colter separates the vines, which pass along the scoop on each side of the standard onto the fingers, which gradually carry the potatoes up the inclined plane formed by the inclination of the fingers, and by which they are discharged on the surface of the earth, the shaking of the fingers at the same time loosening the earth, which passes through the spaces between the fingers.

Other modes of shaking the fingers less simple and effective than the wheel of cams may be substituted—as, for instance, a lever jointed to the plate of fingers and vibrated by cams on a wheel running by the side of the machine; but the mode described, in my judgment, is preferable.

What I claim as my invention, and desire to secure by Letters Patent, is—

1. The employment of the inclined fingers, in combination with the scoop, for the purpose and in the manner substantially as herein described.

2. Giving to the fingers a vibratory motion the better to separate and discharge the earth, substantially as herein described.

ALLEN ELDRED.

Witnesses:
CHAS. M. KELLER,
H. P. BROWNE.